United States Patent
Imamura et al.

(10) Patent No.: US 8,994,503 B2
(45) Date of Patent: Mar. 31, 2015

(54) RFID EVALUATION SYSTEM, TARGET POSITION INDICATING APPARATUS, AND TARGET POSITION INDICATING PROGRAM FOR CHANGING A POSTURE OF AN RFID TAG

(75) Inventors: Jun Imamura, Kanagawa (JP); Tsutomu Kawase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 128 days.

(21) Appl. No.: 13/590,529

(22) Filed: Aug. 21, 2012

(65) Prior Publication Data
US 2013/0049936 A1    Feb. 28, 2013

(30) Foreign Application Priority Data
Aug. 30, 2011 (JP) ................................. 2011-187603

(51) Int. Cl.
*G08B 21/00* (2006.01)
*G06K 7/00* (2006.01)

(52) U.S. Cl.
CPC .................................. *G06K 7/0095* (2013.01)
USPC ..... 340/10.1; 340/10.3; 340/10.4; 340/572.1; 340/572.8; 342/450

(58) Field of Classification Search
CPC . G06K 17/00; G06K 19/0723; G06K 7/0008; G06K 7/0095
USPC ......................................................... 342/450
See application file for complete search history.

(56) References Cited

U.S. PATENT DOCUMENTS

| | | | |
|---|---|---|---|
| 6,335,685 B1 * | 1/2002 | Schrott et al. ............... | 340/572.1 |
| 2006/0068701 A1 * | 3/2006 | Chapman et al. ............ | 455/41.1 |
| 2008/0001758 A1 * | 1/2008 | Bhogal et al. ............... | 340/572.7 |
| 2009/0231142 A1 * | 9/2009 | Nikitin et al. ............... | 340/572.8 |
| 2010/0207729 A1 * | 8/2010 | Ko et al. ...................... | 340/10.1 |

FOREIGN PATENT DOCUMENTS

| | | |
|---|---|---|
| JP | 10-111331 | 4/1998 |
| JP | 2010-515132 | 5/2010 |
| JP | 4579599 | 11/2010 |
| WO | 2008/086703 A1 | 7/2008 |

OTHER PUBLICATIONS

Office Action issued Dec. 24, 2014 in Japanese Patent Application No. 2011-187603.

* cited by examiner

*Primary Examiner* — George Bugg
*Assistant Examiner* — Mark Rushing
(74) *Attorney, Agent, or Firm* — Oblon, McClelland, Maier & Neustadt, L.L.P.

(57) ABSTRACT

An RFID evaluation system which evaluates an RFID system is disclosed, the RFID evaluation system including a tag position and posture varying unit which accepts a manual operation from an operator to vary a position of an RFID tag and automatically varies a posture of the RFID tag; an antenna unit which transmits a radio signal for testing to the RFID tag and which receives the radio signal transmitted from the RFID tag; and a control unit which, for each combination of the position and the posture of the RFID tag, controls the antenna unit to measure a response radio wave strength of the RFID tag, wherein the control unit includes a position measuring unit which measures the position of the RFID tag; and an information providing unit which provides information for moving the RFID tag to a target position.

6 Claims, 14 Drawing Sheets

SCREEN PATTERN

PROJECTION PATTERN

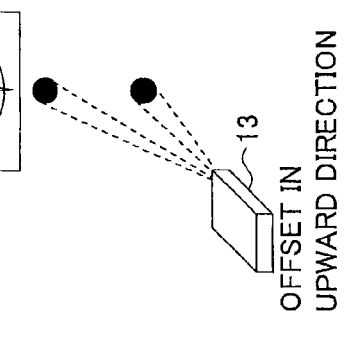
FIG.11A  FIG.11B  FIG.11C  FIG.11D
OFFSET IN BACK DIRECTION    OFFSET IN FRONT DIRECTION    OFFSET IN LEFT DIRECTION    OFFSET IN UPWARD DIRECTION
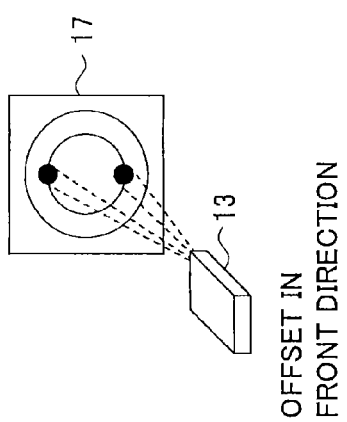
FIG.11E
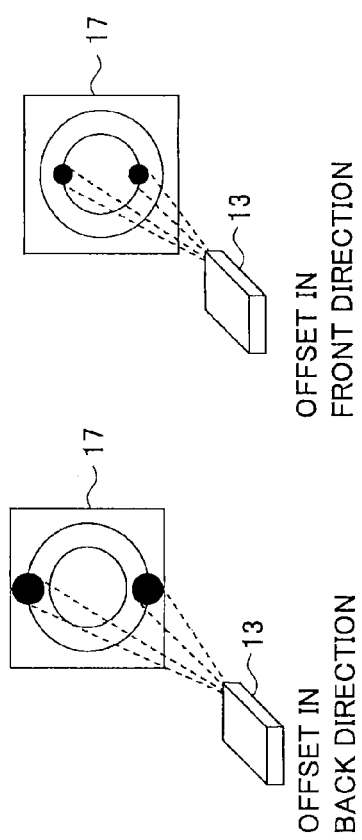
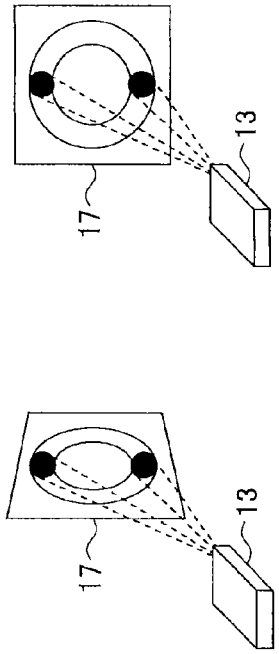
ALIGNED WITH TARGET POSITION (COMPLETE TAG MOVEMENT AT THIS STATE)

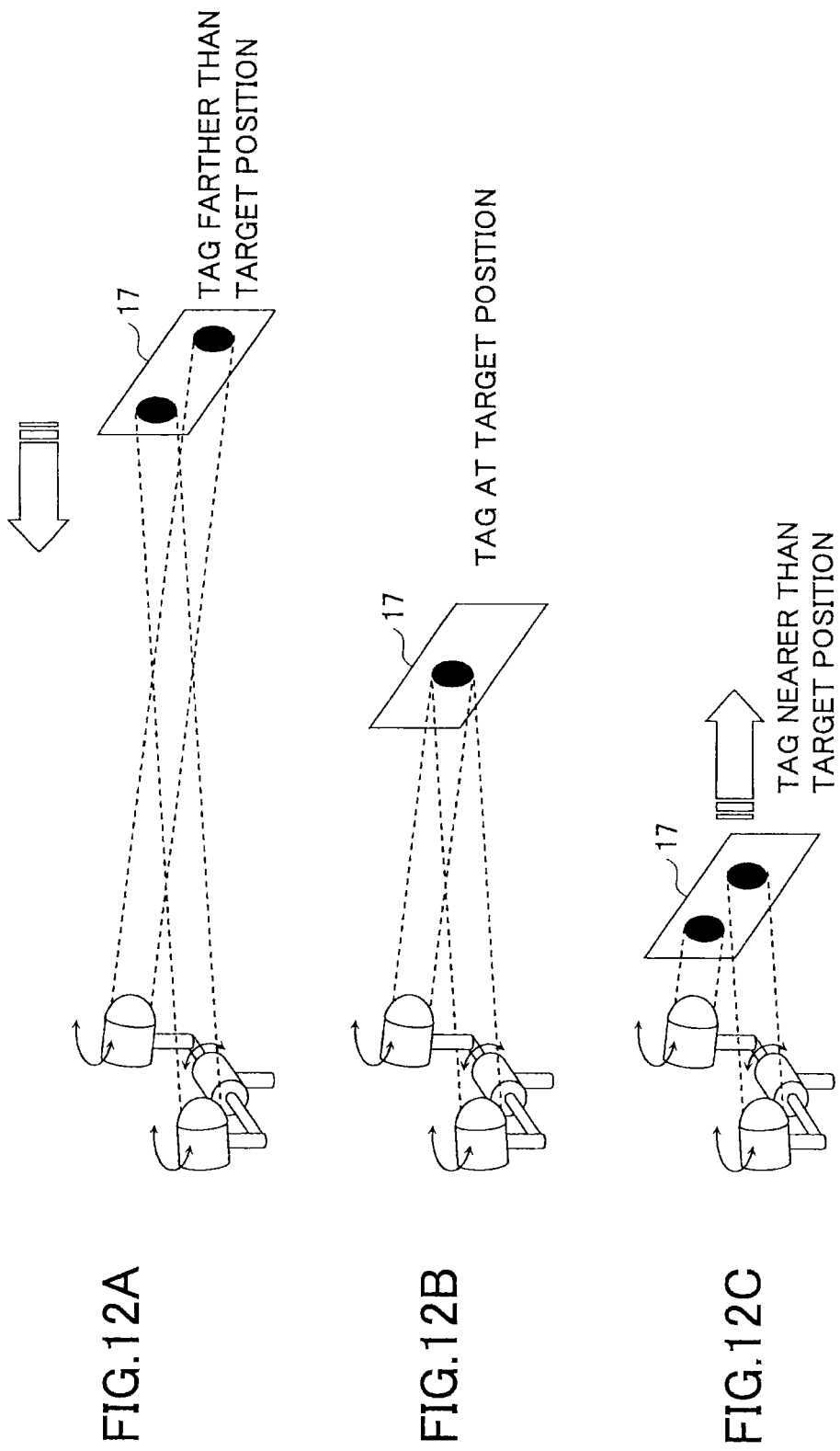

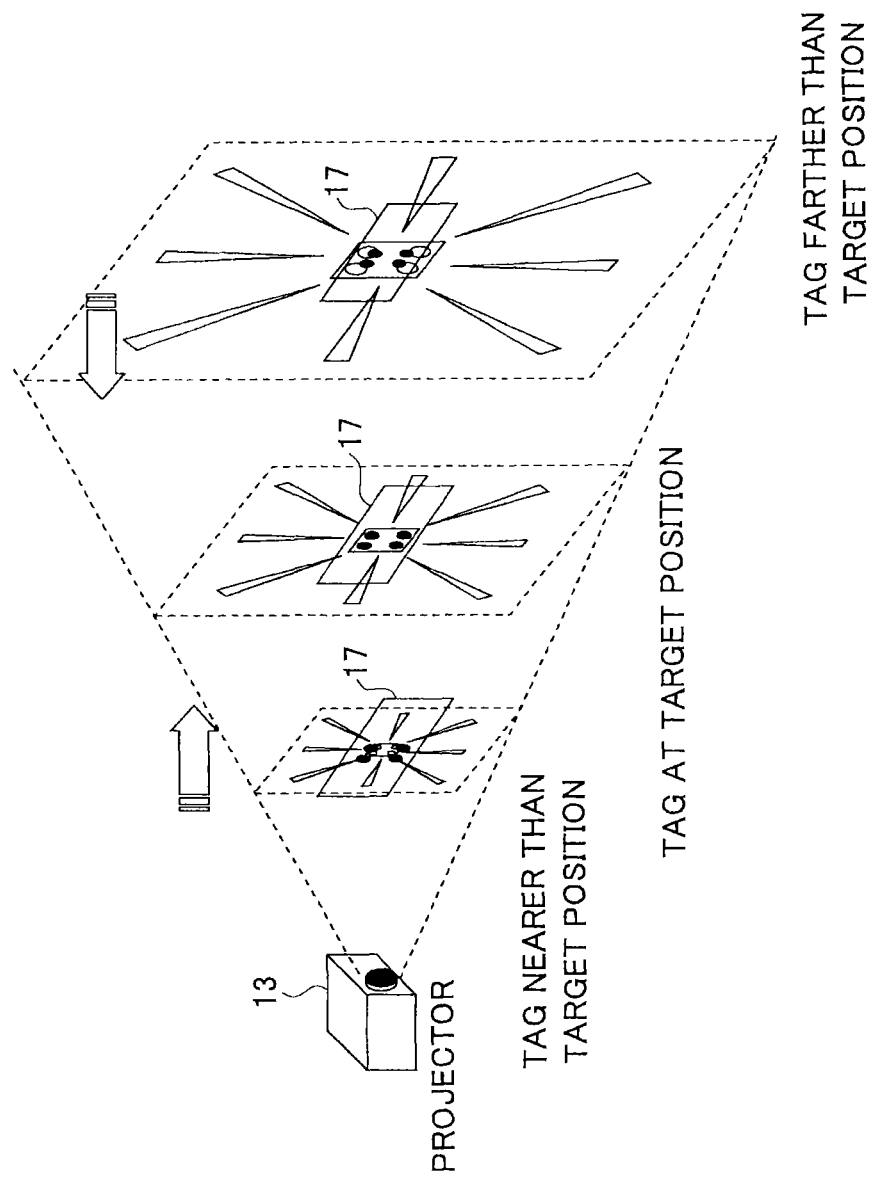

RFID EVALUATION SYSTEM, TARGET POSITION INDICATING APPARATUS, AND TARGET POSITION INDICATING PROGRAM FOR CHANGING A POSTURE OF AN RFID TAG

TECHNICAL FIELD

The present invention relates to RFID evaluation systems, target position indicating apparatuses, and target position indicating programs.

BACKGROUND ART

A system for evaluating an RFID (radio frequency identification) tag that evaluates the RFID tag, taking into account a degree of freedom of a relative posture which is unique to radio authentication is known in the related art. For example, as an example of the system for evaluating the RFID tag, an RFID tag evaluation system is known, including a positioning apparatus having an elongated plate-shaped radial direction rail which moveably supports a tested object fixing unit for holding the RFID tag to be evaluated; a radial driving unit which moves the tested object fixing unit back and forth on the radial direction rail to change a moving radius to an arbitrary one; an elevation angle driving unit which drives the radial direction rail in an arbitrary elevation angle direction by rotating the radial direction rail from an origin which is a base part of one end of the radial direction rail upward and downward relative to a horizontal face; and a direction angle driving unit which drives the radial direction rail so as to rotate it in an arbitrary direction angle with, as an axis, a vertical portion which is vertical relative to the horizontal face located at the origin; an antenna arranged at the origin position that transmits a radio signal for testing to the RFID tag and that receives the radio signal transmitted from the RFID tag; and a testing apparatus which transmits a radio signal from the antenna to the RFID tag for each combination of respective values of moving radii, elevation angles and direction angles and receives a radio signal received from the RFID tag to change the respective moving radii, elevation angles, and direction angles to evaluate the RFID tag (see Patent document 1, for example).

However, with the above described RFID tag evaluation system, it is necessary to take measures such as providing, outside a moveable range of the positioning apparatus, a fence, etc., taking into account work format, working site conditions, etc., in order to prevent danger due to humans coming into contact with the positioning apparatus in operation based on specifications such as labor safety and health regulations, etc., when the positioning apparatus is an industrial robot.

Therefore, with the above-described RFID tag evaluation system, there is a problem that it is not simple to take the RFID system into a location at which the RFID system is actually implemented. With the above-described RFID tag evaluation system, there is a problem that an evaluation of the RFID tag at the location at which the RFID system is actually implemented may differ from an evaluation of the RFID tag carried out by preparing, in an anechoic chamber, etc., an environment which approximates the location at which the RFID system is actually implemented, for example.

Patent Document

Patent document 1: JP4579599B

DISCLOSURE OF THE INVENTION

In light of the problems described above, an object of the present invention is to provide an RFID evaluation system, a target position indicating apparatus, and a target position indicating program that make it possible to easily evaluate an RFID system at a location at which it is implemented.

According to an embodiment of the present invention, an RFID evaluation system which evaluates an RFID system is provided, the RFID evaluation system including: a tag position and posture varying unit which accepts a manual operation from an operator to vary a position of an RFID tag and automatically varies a posture of the RFID tag; an antenna unit which transmits a radio signal for testing to the RFID tag and which receives the radio signal transmitted from the RFID tag; and a control unit which, for each combination of the position and the posture of the RFID tag, controls the antenna unit to measure a response radio wave strength of the RFID tag, wherein the control unit includes a position measuring unit which measures the position of the RFID tag; and an information providing unit which provides information for moving the RFID tag to a target position.

A form of the present invention in which elements, representations, or arbitrary combinations of the elements of the present invention are applied to a method, an apparatus, a system, a computer program, a recording medium, a data structure, etc., is also effective as a mode of the present invention.

The present invention makes it possible to provide an RFID evaluation system, a target position indicating apparatus, and a target position indicating program that make it possible to easily evaluate an RFID system at a location at which it is implemented.

BRIEF DESCRIPTION OF THE DRAWINGS

Other objects, features, and advantages of the present invention will become more apparent from the following detailed descriptions when read in conjunction with the accompanying drawings, in which:

FIGS. 11A, 11B, 11C, 11D, and 11E are image diagrams of an exemplary projection pattern projected onto a screen;

FIGS. 12A, 12B, and 12C are diagrams for explaining another exemplary method of indicating target position; and FIGS. 13A and 13B are diagrams for explaining yet another exemplary method of indicating target position.

BEST MODE FOR CARRYING OUT THE INVENTION

Embodiments of the present invention are described in detail below.

When implementing an RFID system, it needs to be designed such that an RFID tag is detected at a necessary location and is not detected at an unnecessary location. More specifically, for the RFID system in UHF band that recognizes over a long distance (up to several meters), radio waves are not visible and detection is performed in a wide range, so that determining is difficult.

In this way, when implementing the RFID system, it is necessary to evaluate the non-visible radio waves to evaluate whether an actual RFID system operates stably, or in other words, whether the RFID tag may be read, whether no RFID tag is missed in reading, or whether no unnecessary RFID tag is read.

In order to determine whether the actual RFID system operates stably, it is necessary to grasp, as a response radio wave strength distribution of the RFID tag, what response radio wave strength is achieved at what posture at what position (at what position and posture) of the RFID tag in a space of a location at which the RFID system is actually implemented.

Grasping the response radio wave strength distribution of the RFID tag leads to stable operating conditions of the RFID tag (at what posture and at what range it is passed) being recognized.

If a response radio wave strength distribution of the RFID tag before operation is grasped accurately, the RFID system may, in a short time, accurately investigate causes and propose actions to be taken by grasping the response radio wave strength distribution of the RFID tag and comparing it with the response radio wave strength distribution of the RFID tag before operation even when the reading performance deteriorates due to some cause after actual operation.

Thus, the RFID evaluation system of the present embodiment that is easily brought into a location at which the RFID system is actually implemented, may arbitrarily designate a position and posture of the RFID tag within a space of a location at which the RFID system is actually implemented and measure the response radio wave strength to grasp the response radio wave strength distribution within the space of the location at which the RFID system is actually implemented and evaluate the RFID system.

(Configuration Diagram)

Figure 1:
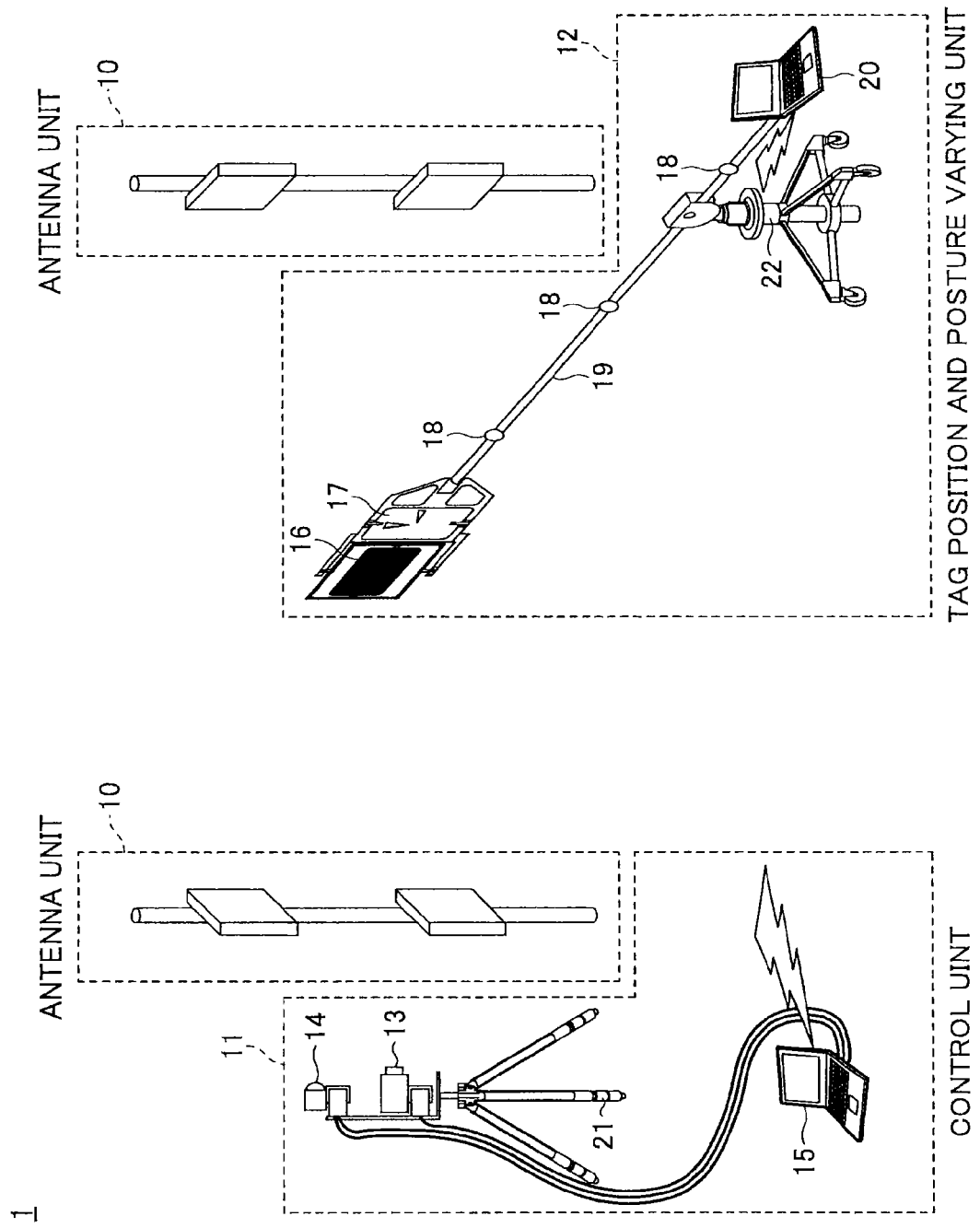
FIG. 1 is a configuration drawing of an example of an RFID evaluation system according to the present embodiment.

FIG. 1 is a configuration diagram of an example of an RFID evaluation system according to the present embodiment. An RFID evaluation system 1 in FIG. 1 includes an antenna unit 10; a control unit 11; a tag position and posture varying unit 12. In FIG. 1, two antenna units 10 make up a gate. The antenna units 10 are not limited to two.

The antenna unit 10, whose illustration is omitted in FIG. 1, is communicatively connected to a PC 15 of the control unit 11. A form of connection between the antenna unit 10 and the PC 15 may be wireless or wired. The antenna unit 10 transmits a radio signal for testing to an RFID tag 16 held by the tag position and posture varying unit 12 and receives the radio signal transmitted from the RFID tag 16 by a control from the PC 15. The antenna unit 10 transmits the received radio signal to the PC 15. An RFID reader/writer is embedded in the antenna unit 10, for example. The RFID reader/writer may be separately provided between the antenna unit 10 and the PC 15. The antenna unit 10 is an example of an RFID tag detecting unit.

The control unit 11 includes a projector 13, a stereo camera 14, and the PC 15. The projector 13 projects, onto a screen 17 of the tag position and posture varying unit 12, information for moving, to a target position, the RFID tag 16 with a control of the PC 15, indicating to an operator which operates the tag position and posture varying unit 12. Information for moving the RFID tag 16 to the target position may be displayed at a PC 20 of the tag position and posture varying unit 12.

The stereo camera 14 shoots a marker 18 of the tag position and posture varying unit 12 with a control of the PC 15. The marker 18 is fixed to a predetermined position of a crane 19 of the tag position and posture varying unit 12.

The PC 15 may measure a three-dimensional position of the marker 18 from results of shooting by the stereo camera 14. The PC 15 may set, in advance, a positional relationship between the marker 18 and the RFID tag 16 fixed to the crane 19 to compute a three-dimensional position of the RFID tag 16 from a three-dimensional position of the marker 18.

Moreover, the PC 15 measures the three-dimensional position of the marker from the results of shooting by the stereo camera 14 to compute a direction angle of the crane 19 and transmit the direction angle of the crane 19 to the tag position and posture varying unit 12.

The tag position and posture varying unit 12 includes a moving mechanism which moves a position of the RFID tag 16 which is fixed to a tip of the crane 19; a posture control mechanism which controls a posture of the RFID tag 16 fixed to the tip of the crane 19, and a PC 20.

To the crane 19 is fixed the RFID tag 16, a screen 17, the marker 18, the PC 20, and a gravitational acceleration sensor (not shown). For example, the marker 18 may be implemented with LEDs. For example, the marker 18 is desirably implemented with the LEDs of different colors.

The moving mechanism of the tag position and posture varying unit 12 moves a position of the RFID tag 16 fixed to the tip of the crane 19 by the operator manually moving a position of the tag position and posture varying unit 12, or manually changing elevation and direction angles of the crane 19. The posture control mechanism of the tag position and posture varying unit 12 automatically changes the posture of the RFID tag 16 with a control of the PC 20.

In this way, with the moving mechanism of the tag position and posture varying unit 12, the operator manually changes the position of the tag position and posture varying unit 12 or changes the elevation and direction angles of the crane 19, so that it is necessary to take a measure such as providing, rather than an industrial robot, a fence, etc., outside a moving range of the tag position and posture varying unit 12. Therefore, it becomes easy for the tag position and posture varying unit 12 to be taken into a location at which the RFID evaluation system 1 is actually implemented.

As described above, the direction angle of the crane 19 is received from the control unit 11 side. The elevation angle (pitch angle) of the crane 19 is measured with a gravitational acceleration sensor. The PC 20 may calculate the posture of the crane 19 with the direction and elevation angles of the crane 19. Therefore, the PC 20 may control the posture of the RFID tag 16 fixed to the tip of the crane 19 such that a relative posture of the RFID tag 16 relative to the antenna unit 10 takes a predetermined posture based on the computed posture of the crane 19.

After controlling the relative posture of the RFID tag 16 relative to the antenna unit 10 to a predetermined posture, the PC 20 requests the PC 15 of the control unit 11 to measure a response radio wave strength. The PC 15 controls the antenna unit 10 to measure the response radio wave strength of the RFID tag 16. After the measuring of the response radio wave strength is completed, the PC 15 reports a completion of the measuring of the response radio wave strength to the PC 20 of the tag position and posture varying unit 12.

The PC 15 of the control unit 11 and the PC 20 of the tag position and posture varying unit 12 are communicatively connected. A form of connecting the PC 15 of the control unit 11 and the PC 20 of the tag position and posture varying unit 12 may be wired or wireless.

Therefore, with the RFID evaluation system 1 in FIG. 1, the posture of the RFID tag 16 is automatically controlled, so that the response radio wave strength may be measured by the operator of the tag position and posture varying unit 12 moving the RFID tag 16 fixed to the tip of the crane 19 to an arbitrary position within a space of a location to be implemented according to an indication projected onto the screen 17.

Figure 2:
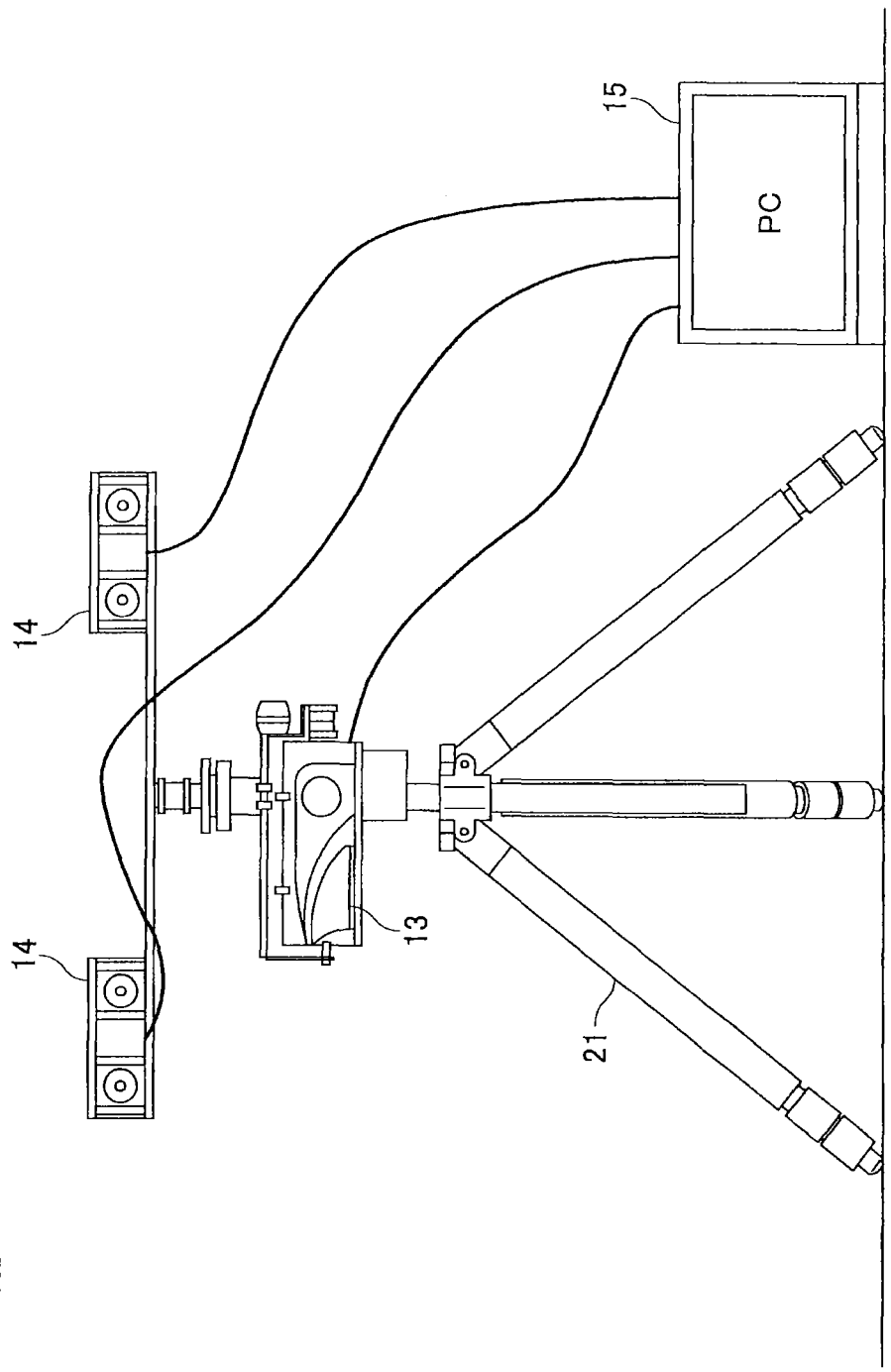
FIG. 2 is a configuration diagram of an exemplary control unit.

FIG. 2 is a configuration diagram of an exemplary control unit. For the control unit 11 in FIG. 2, the projector 13 and the stereo camera 14 are fixed to a tripod 21. The projector 13 and the stereo camera 14 are communicatively connected with the PC 15 via a cable. While the PC 15 is not fixed to the tripod 21 in the control unit 11 in FIG. 2, it may be arranged to fix the PC 15 to the tripod 21.

Figure 3:
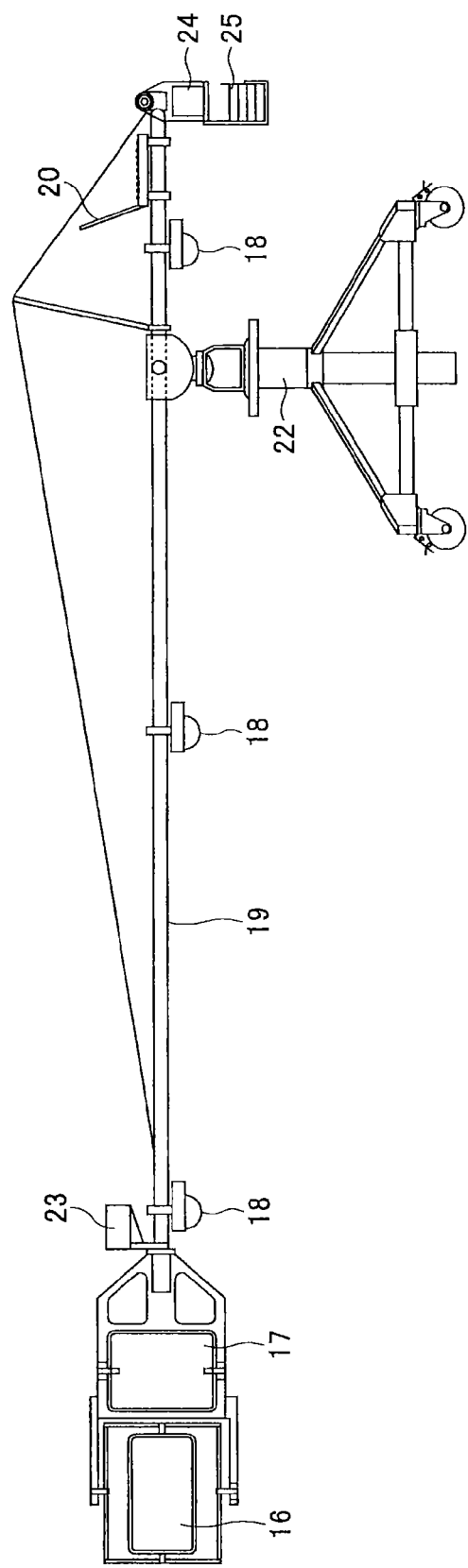
FIG. 3 is a configuration diagram of a tag position and posture varying unit.

FIG. 3 is a configuration diagram of a tag position and posture varying unit. For the tag position and posture varying unit 12 in FIG. 3, the crane 19 is fixed to a pedestal 22 such that the crane can be moved with respect to the direction and elevation angles. The pedestal 22, which is provided with a wheel, facilitates moving the position of the tag position posture varying unit 12. The moving mechanism which moves the position of the RFID tag 16 is realized by moving the position of the tag position and posture varying unit 12 by the pedestal 22 and movability of the crane 19 with respect to the direction and elevation angles.

To the crane 19 of FIG. 3 is fixed the RFID tag 16, the screen 17, three markers 18, the PC 20, a gravitational acceleration sensor 23, a battery 24, and a balance weight unit 25.

The RFID tag 16 is fixed to the tip of the crane 19 such that the posture may be controlled from the PC 20. For example, a posture control mechanism which controls the posture of the RFID tag 16 may be realized by controlling, from the PC 20 with a motor, etc., a direction of a part to which the RFID tag 16 is fixed.

The screen 17 is fixed to the crane 19 such that it may be oriented to a direction which is easy to view from an operator. The marker 18 may be realized with an LED. The gravity acceleration sensor 23 measures an elevation angle (a pitch angle) of the crane 19 to transmit the measured results to the PC 20. The battery 24 supplies electric power used by the marker 18 or the posture control mechanism. Moreover, the balance weight unit 25 is a balance weight for reducing power needed to move the crane 19 with respect to the direction and elevation angles.

Figure 4:
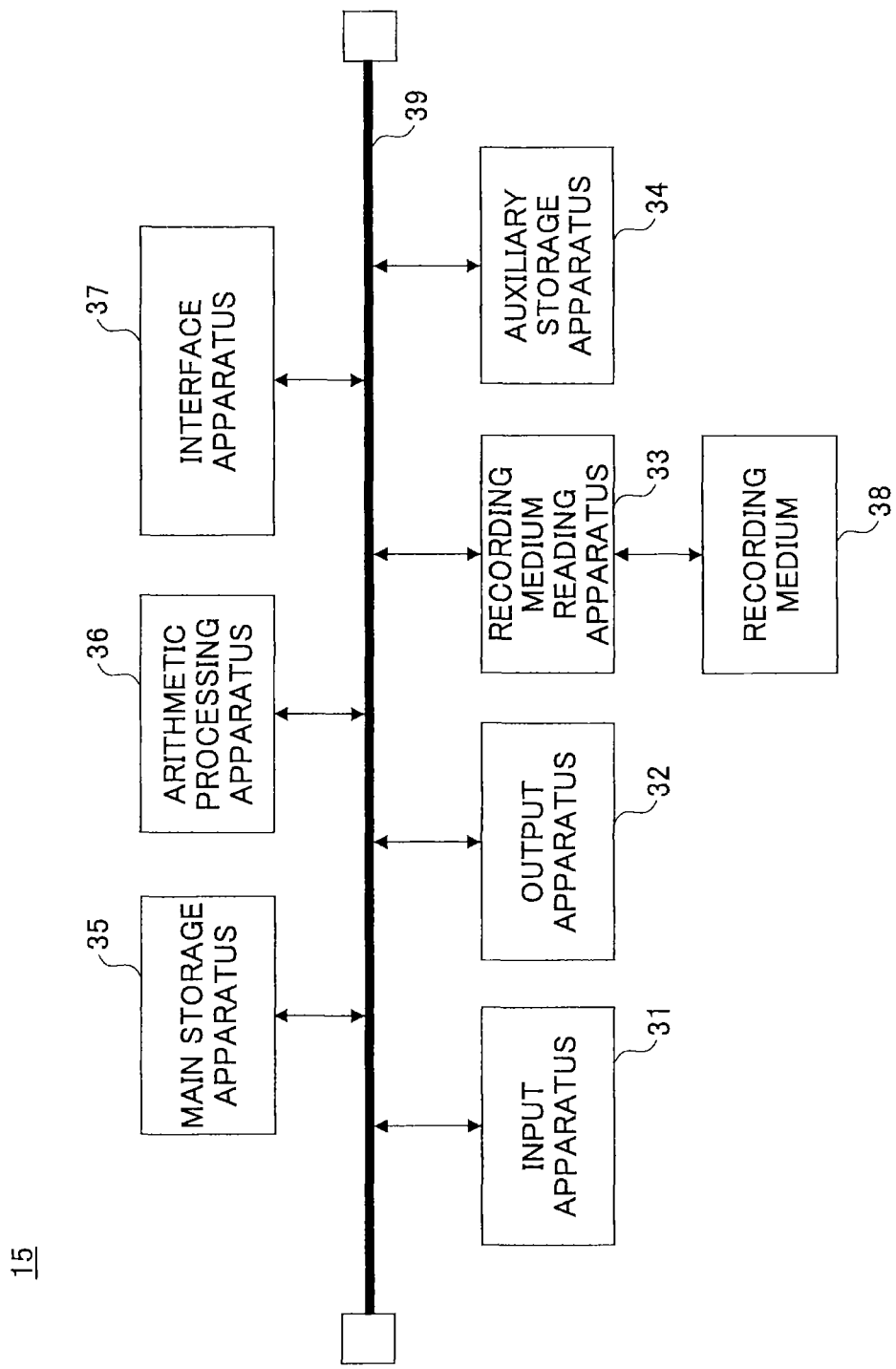
FIG. 4 is a hardware configuration diagram of an exemplary PC.

The PC 15 of the control unit 11 and the PC 20 of the tag position and posture varying unit 12 are realized by a hardware configuration as shown in FIG. 4, for example. FIG. 4 is a hardware configuration diagram of an exemplary PC. Here, the PC 15 is explained as an example.

The PC 15 is configured to include an input apparatus 31, an output apparatus 32, a recording medium reading apparatus 33, an auxiliary storage apparatus 34, a main storage apparatus 35, an arithmetic processing apparatus 36, and an interface apparatus 37 that are mutually connected via a bus 39.

The input apparatus 31 includes a keyboard, a mouse, etc. The input apparatus 31 is used for inputting various signals. The output apparatus 32 includes a display apparatus, etc. The output apparatus 32 is used for displaying various windows, data, etc. The interface apparatus 37 includes a modem, a LAN card, a USB (universal serial bus), etc. The interface apparatus 37 is used for connecting to a network such as the Internet and a LAN, and to other equipment units such as the projector 13, the stereo camera 14, for example.

The target position indicating program for realizing the control unit 11 is at least a part of various programs which control the PC 15. The target position indicating program is provided by distributing the recording medium 38, downloading from the network, etc., for example.

For the recording medium 38, various types of recording media may be used such as a recording medium which optically, electrically, or magnetically records information such as a CD-ROM, a flexible disk, a magneto-optical disk, etc.; a semiconductor memory which electrically records information such as a ROM, a flash memory, etc.

When the recording medium 38 having recorded the target position indicating program therein is set to the recording medium reading apparatus 33, the target position indicating program is installed from the recording medium 38 to the auxiliary storage apparatus 34 via the recording medium reading apparatus 33. The target position indicating program which is downloaded from the network, etc., is installed in the auxiliary storage apparatus 34 via the interface apparatus 37.

The auxiliary storage apparatus 34 stores therein data, files, programs including the target position indicating program, etc. The main storage apparatus 35 reads the target position indicating program from the auxiliary storage apparatus 34 at the time of launching the target position indicating program to store therein the read results. The arithmetic processing apparatus 36 implements various processes according to the target position indicating program stored in the main storage apparatus 35.

(Processing Procedure)

Figure 5:
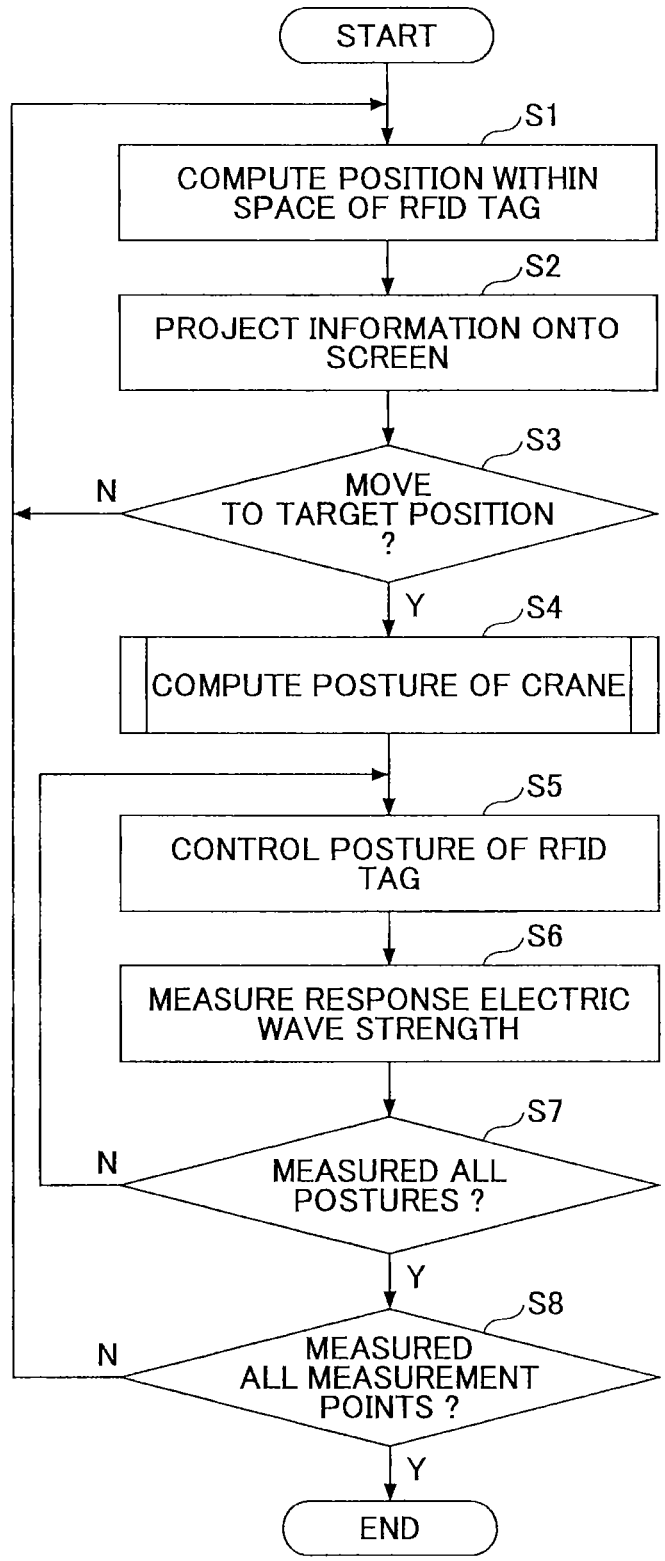
FIG. 5 is a flowchart of an exemplary process of the RFID evaluation system.

The RFID evaluation system 1 performs a process according to a procedure of a flowchart shown in FIG. 5, for example. FIG. 5 is a flowchart of an exemplary process of the RFID evaluation system. The process of the flowchart in FIG. 5 is started by an operator instructing from the PC 20, for example.

In step S1, the PC 15 controls the stereo camera 14 to shoot the marker 18 of the tag position and posture varying unit 12. The PC 15 measures the three-dimensional position of the marker 18 from results of shooting with the stereo camera 14. The PC 15 may compute the three-dimensional position of the RFID tag 16 from the measured three-dimensional position of the marker 18 and a positional relationship between the marker 18 and the RFID tag 16 fixed to the crane 19.

In step S2, based on a target position, which is a next measuring point, and the three-dimensional position of the RFID tag 16 calculated, the PC 15 creates information for the operator to move the RFID tag 16 to the target position. Details of the information for the operator to move the RFID tag 16 to the target position are described below. Then, the PC 15 controls the projector 13 to project information for the operator to move the RFID tag 16 to the target position onto the screen 17 of the tag location position varying unit 12.

The PC 15 repeats the process of steps S1-S3 until the calculated three-dimensional position of the RFID tag 16 takes a target position, which is the next measuring point. The operator moves the RFID tag 16 to the target position with a moving mechanism of the tag position and posture varying unit 12 while checking information projected onto the screen 17. When, in step S3, the PC 15 determines that the three-dimensional position of the RFID tag 16 became the target position which is the next measuring point, or, in other words, the RFID 16 moved to the target position, the process of step S4 is performed.

In step S4, the PC 15 measures the three-dimensional position of the marker 18 from shooting results with the stereo camera 14 to compute the direction angle of the crane 19. The PC 15, when it determines that the RFID tag 16 moved to the target position, may transmit the direction angle of the crane 19 to the PC 20 to report that the RFID tag 16 moved to the target position.

The PC 20 computes the posture of the crane 19 with the elevation angle of the crane 19 that is measured by the gravitational acceleration sensor and the direction angle of the crane 19. Details of the process in step S4 are described below. The process of step S4 is for determining, from the posture of the crane 19, the posture of the RFID tag 16 which changed at the same time the elevation and direction angles of the crane 19 were changed.

In step S5, the PC 20 controls the posture of the RFID tag 16 fixed to the tip of the crane 19 such that a relative posture of the RFID tag 16 relative to the antenna unit 10 takes a predetermined posture based on the computed posture of the crane 19. After controlling the relative posture of the RFID tag 16 relative to the antenna unit 10 to a predetermined posture, the PC 20 requests the PC 15 of the control unit 11 to measure the response radio wave strength. The PC 20 may request measurement of the response radio wave strength to the PC 15 to report that the relative posture of the RFID tag 16 relative to the antenna unit 10 became a predetermined posture.

In step S6, the PC 15 controls the antenna unit 10 to measure the response radio wave strength of the RFID tag 16. After the measuring of the response radio wave strength is completed, the PC 15 reports the completion of the measuring of the response radio wave strength to the PC 20 of the tag position and posture varying unit 12.

In step S7, at the measuring point moved to in step S3, the PC 20 determines whether the measuring of the response radio wave strength at all postures of the RFID tag 16 is completed. The posture of the RFID tag 16 for measuring the response radio wave strength is set in multiple numbers in advance. At the measuring point moved to in step S3, if the measuring of the response radio wave strength at all postures of the RFID tag 16 is not completed, the PC 20 returns to step S5.

At the measuring point moved to in step S3, if the measuring of the response radio wave strength at all postures of the RFID tag 16 is completed, the PC 20 in step S8 determines whether the measuring of the response radio wave strength at all measuring points is completed. When the measuring of the response radio wave strength at not all the measuring points is not completed, the PC 20 returns to step S1, and starts a process for the next measuring point. When measuring of the response radio wave strength of all the measuring points are completed, the PC 20 completes the process.

Figure 6:
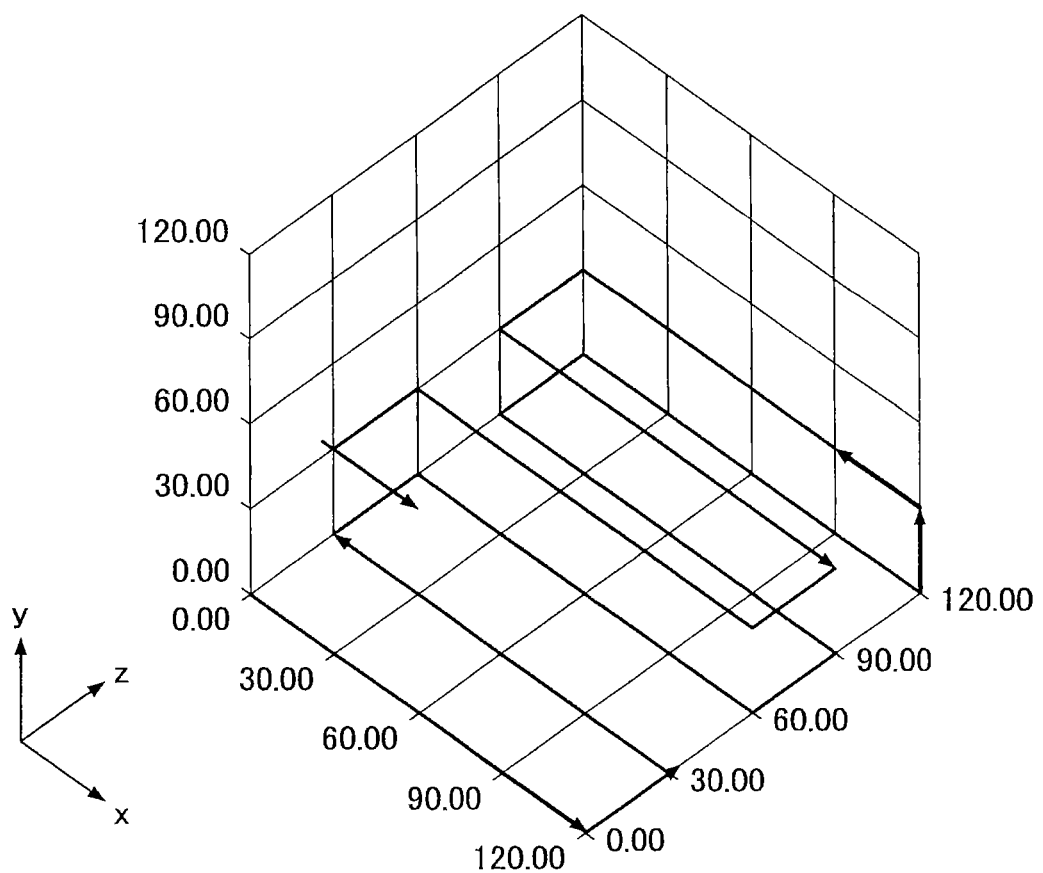
FIG. 6 is an image diagram of an example of multiple measuring points.

In the process of the flowchart shown in FIG. 5, the RFID evaluation system 1 may measure the response radio wave strength of all postures of the RFID 16 at multiple measuring points such as shown in FIG. 6, for example.

FIG. 6 is an image diagram of an example of multiple measuring points. FIG. 6 shows measuring points for a range of 1.2 meters and measuring intervals of 30 cm. In FIG. 6, the measuring point is represented by a crossing point. the RFID evaluation system 1 performs measuring in an order of x, then z, and then y, until measuring a tip of a space to be measured, and then turns around to perform the measuring. FIG. 6 shows an order of the measuring in arrows.

Figure 7:
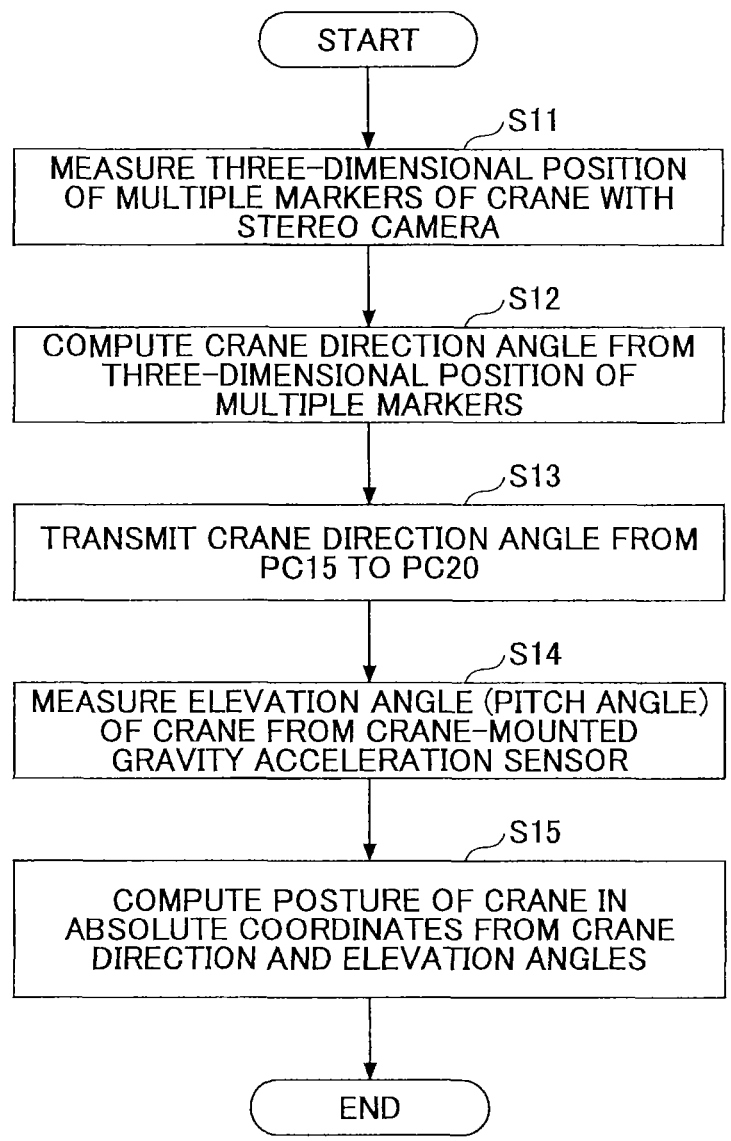
FIG. 7 is a flowchart of an example of a process which computes a posture of a crane.
Figure 8:
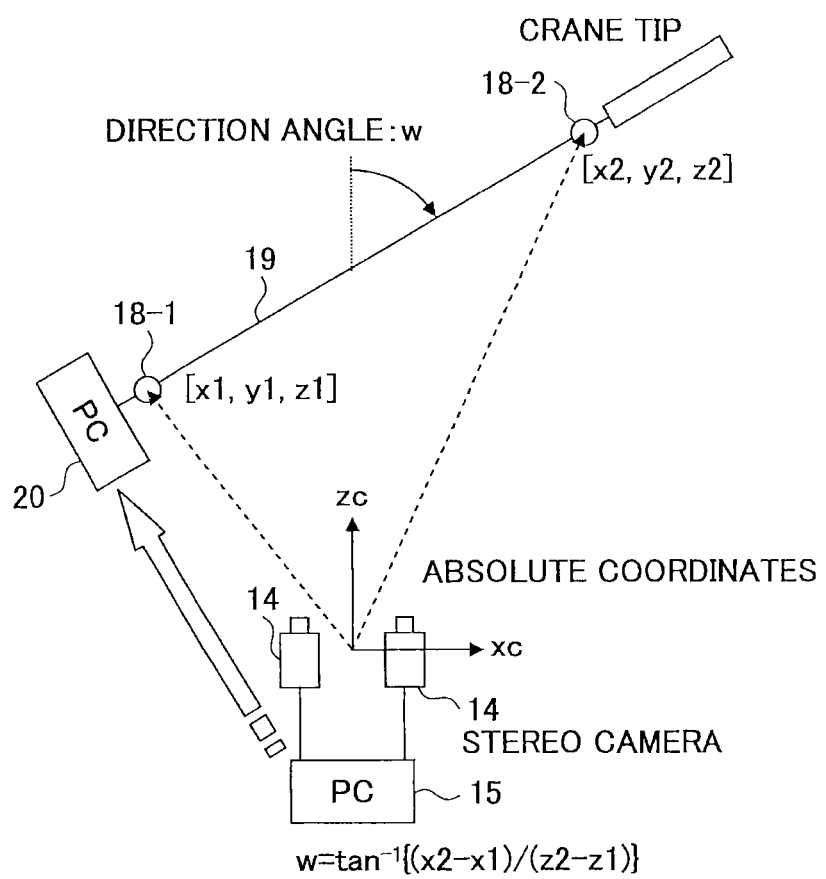
FIG. 8 is an image of an example of a process which computes a direction angle of the crane.

FIG. 7 is a flowchart of an example of a process which computes a posture of a crane. FIG. 8 is an image of an example of a process which computes a direction angle of the crane. Here, the process which computes the direction angle of the crane included in the flowchart in FIG. 7 is described with reference to FIG. 8.

In step S11, the PC 15 controls the stereo camera 14 to shoot markers 18-1 and 18-2 of the tag position and posture varying unit 12. The PC 15 measures the three-dimensional position [x1, y1, z1] of the marker 18-1 and the three-dimensional position [x2, y2, z2] of the marker 18-2 from results of shooting with the stereo camera 14.

In step S12, the PC 15 computes the direction angle w of the crane 19 using Equation (1) below from the three-dimensional positions of the markers 18-1 and 18-2.

$$w = \tan^{-1}\{(x2-x1)/(z2-z1)\} \qquad (1)$$

In step S13, the PC 15 transmits the computed direction angle w of the crane 19 to the PC 20. In step S14, the PC 20 measures the elevation angle of the crane 19 from the gravitational acceleration sensor 23 fixed to the crane 19. In step S15, the PC 20 computes the posture of the crane 19 with the elevation angle and the direction angle w of the crane 19.

Figure 9:
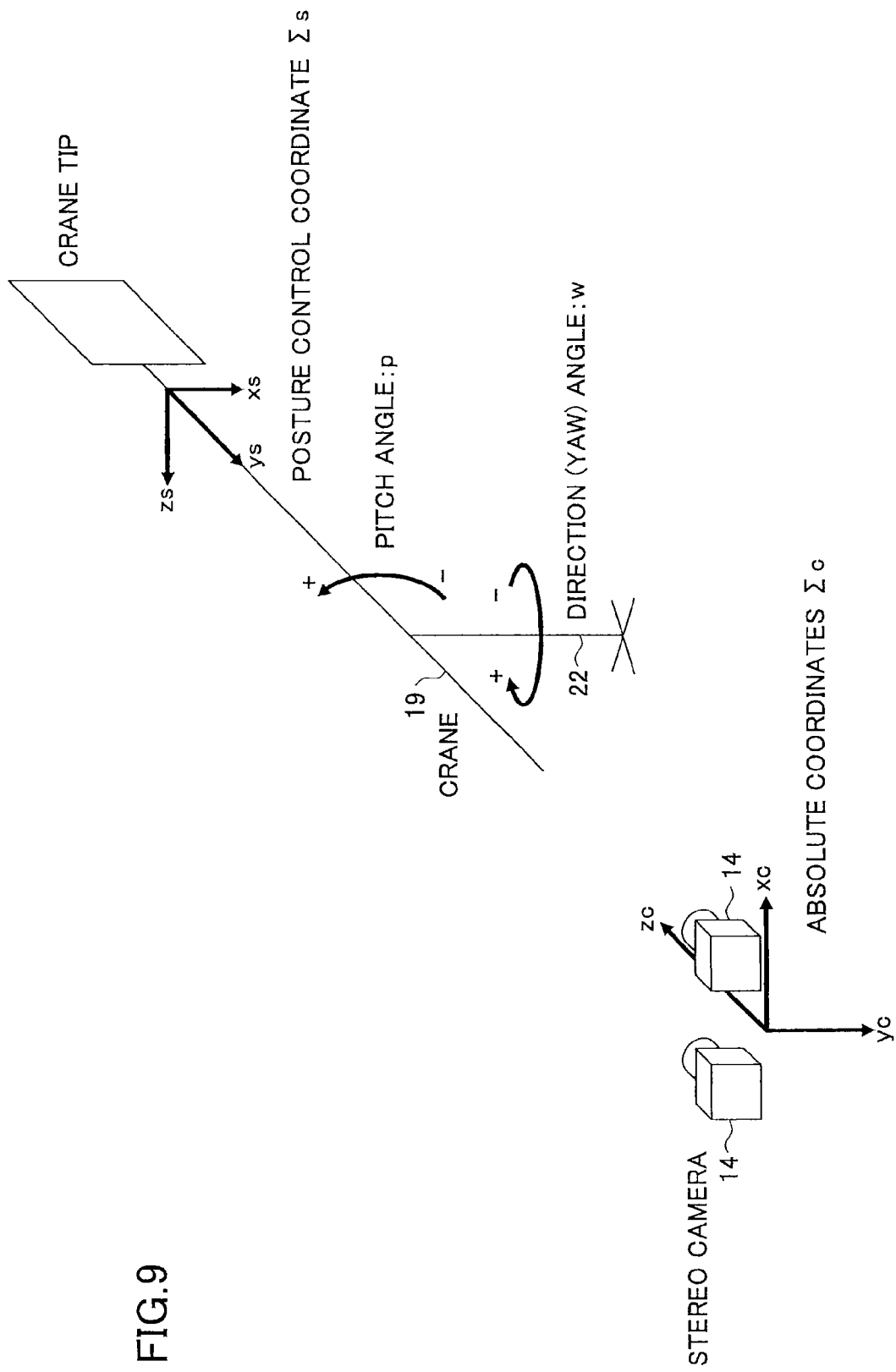
FIG. 9 is an exemplary explanatory diagram for explaining setting of absolute and position control coordinates.

Details of the process which computes the posture of the crane 19 with respect to direction w and elevation angles of the crane 19 are described below. The PC 20 sets posture control coordinates Σs of the crane 19 and absolute coordinates Σc as shown in FIG. 9. FIG. 9 is an exemplary explanatory diagram which describes setting of the absolute and position control coordinates.

The absolute coordinates Σc become coordinates (xc, yc, zc) of the stereo camera 14 around a rotating angle of a camera platform fixed to a tripod 21. The posture control coordinates Σs are coordinates (xs, ys, zs) of the crane 19. For the elevation angle (pitch angle) p of the crane 19, a direction in which the tip of the crane moves upward is defined to be positive. For the direction angle (yaw angle) w of the crane 19, a clockwise rotating direction as viewed from the top is defined to be positive.

Moreover, the posture of the posture control coordinates Σs in the absolute coordinates τc is defined to be $${}^c R_s.$$

${}^c R_s$, when the pitch angle p=0 and the direction angle w=0, is defined to be a default posture of the posture control coordinates τs $${}^c R_{s0} = \begin{bmatrix} 0 & 0 & -1 \\ 1 & 0 & 0 \\ 0 & -1 & 0 \end{bmatrix}.$$

A rotation matrix Rpw, which rotates by p around an xc axis and by w around a yc axis, is defined to be $$R_{pw} = \begin{bmatrix} cw & 0 & sw \\ 0 & 1 & 0 \\ -sw & 0 & cw \end{bmatrix} \begin{bmatrix} 1 & 0 & 0 \\ 0 & cp & -sp \\ 0 & sp & cp \end{bmatrix} = \begin{bmatrix} cw & spsw & cpsw \\ 0 & cp & -sp \\ -sw & spcw & cpcw \end{bmatrix}.$$

The posture of the posture control coordinates τs in the absolute coordinates τc of the crane 19 which rotated by the pitch angle p and the yaw angle w becomes $$^cR_s = R_{pw}{}^cR_{s0} = \begin{bmatrix} spsw & -cpsw & -cw \\ cp & sp & 0 \\ spcw & -cpcw & sw \end{bmatrix}$$

※ $c\theta = \cos\theta, s\theta = \sin\theta$.

As described above, the PC 20 may compute the posture of the crane 19 in the absolute coordinates τc of the crane 19 with the elevation angle w and the direction angle w of the crane 19.

Figure 10B:
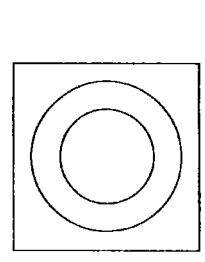
FIGS. 10A and 10B are image diagrams of exemplary projection and screen patterns.
Figure 10A:
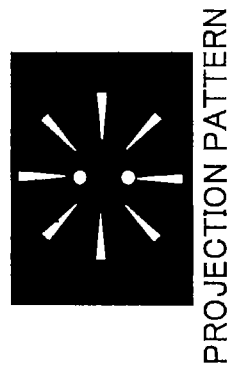

Moreover, an example of information for moving the RFID tag 16 to the target position is described here with reference to FIGS. 10A, 10B, 11A, 11B, 11C, 11D, and 11E. FIGS. 10A and 10B are image diagrams of exemplary projection and screen patterns. FIG. 10A is an image diagram of the projection pattern projected onto the screen 17 from the projector 13. FIG. 10B is an image diagram of the screen pattern to be displayed on the screen 17.

FIGS. 11A, 11B, 11C, 11D, and 11E are image diagrams of an exemplary projection pattern projected onto a screen. For example, when the RFID tag 16 is offset in the back direction from the target position, a projection pattern as shown in FIG. 11A is displayed on the screen 17. When the RFID tag 16 is offset in the front direction from the target position, a projection pattern as shown in FIG. 11B is displayed on the screen 17.

When the RFID tag 16 is offset in the left direction from the target position, a projection pattern as shown in FIG. 11C is displayed on the screen 17. When the RFID tag 16 is offset in the upward direction from the target position, a projection pattern as shown in FIG. 11D is displayed on the screen 17.

When the RFID tag 16 is aligned with the target position, projection patterns as shown in FIG. 11E are displayed on the screen 17. When the projection patterns as shown in FIG. 11E are displayed, the operator completes moving of the RFID tag 16. In this way, a shape of the projection pattern displayed on the screen 17 may be checked to determine the direction in which to move the RFID tag 16.

The PC 15 may change the projection pattern to be displayed on the screen 17 from red to orange to yellow to green as the target position is approached, for example, to make it easier for the operator to understand a distance between the target position and the RFID tag 16.

Below, a different example of indicating target position for the operator to move the RFID tag 16 to the target position and a different example of a process of computing the posture of the crane 19 are described.

For indicating the target position for the operator to move the RFID tag 16 to the target position, there are methods down below other than the methods shown in FIGS. 10A, 10B, 11A, 11B, 11C, 11D, and 11E.

FIGS. 12A, 12B, and 12C are diagrams for explaining another exemplary method of indicating target position. In the method of indicating target position in FIGS. 12A, 12B, and 12C, directive lights may be irradiated such that they cross each other to indicate, as the target position, a position at which the lights overlap. When the RFID tag 16 is farther than the target position, an irradiating pattern as shown in FIG. 12A is displayed on the screen 17 on the tag position and posture varying unit 12 side. When the RFID tag 16 is at the target position, an irradiating pattern as shown in FIG. 12B is displayed on the screen 17 on the tag position and posture varying unit 12 side. When the RFID tag 16 is nearer than the target position, an irradiating pattern as shown in FIG. 12C is displayed on the screen 17 on the tag position and posture varying unit 12 side.

The target position indicating method in FIGS. 12A, 12B, and 12C may be realized inexpensively as it suffices to provide, in lieu of the projector 13, a target position indicating unit which irradiates a directive light and provide the target position indicating unit with a pan and tilt mechanism.

Figure 13B:
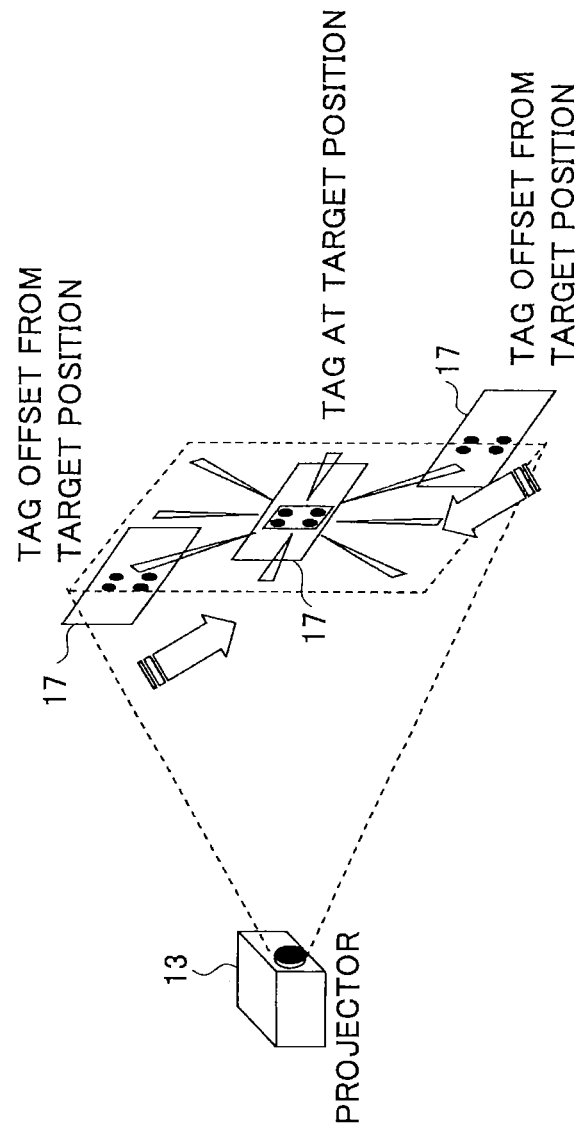

FIGS. 13A and 13B are diagrams for explaining another exemplary method of indicating target position. The method of indicating target position in FIGS. 13A and 13B may project a projection pattern which is the same as a screen pattern displayed on the screen 17 from the projector 13, indicating a position at which the screen pattern and the projection pattern overlap as the target position.

FIG. 13A shows projection patterns displayed onto the screen 17 on the tag position posture varying unit 12 side when the RFID tag 16 is nearer than the target position, when the RFID tag 16 is at the target position, and when the RFID tag 16 is farther than the target position.

Moreover, FIG. 13B shows a projection pattern displayed on the screen 17 on the tag position and posture varying unit 12 when the RFID tag 16 is at the target position, and when the RFID tag 16 is offset laterally from the target position.

The operator may determine a direction in which to move the RFID tag 16 from a difference in size of the projection pattern and the screen pattern. Moreover, the operator may determine a direction in which to move the RFID tag 16 from the projection pattern projected onto the screen 17. The target position indicating method in FIGS. 13A and 13B projects the projection pattern with the projector 13, making the apparatus configuration simpler and making it possible to provide complicated indications to the operator.

Besides, a different example of the method of indicating target position is a method of indicating a direction in which to operate the tag position and posture varying unit 12 to the indicating panel provided at hand of the operator of the tag position and posture varying unit 12. It suffices for the operator to operate according to the indicating panel, so that the operation becomes simple.

Moreover, as a different example of the method of indicating target position, there is a method of making an operator wear a head mount display (HMD) and displaying an unmeasured measuring point (target position) on the HMD to indicate a direction in which to operate the tag position and posture varying unit 12. The operator may intuitively determine a direction in which to operate the tag position and posture varying unit 12.

For the process of computing the posture of the crane 19, a method as described below may also be used besides the above-described method. For example, a geomagnetic sensor and a gravitational acceleration sensor as posture sensors may be mounted to the tag position and posture varying unit 12 to compute the posture of the crane 19 based on measured values from the posture sensors.

Moreover, the tag position and posture varying unit 12 may have mounted thereto a camera to shoot an external marker, etc., to compute the position and posture of the crane 19. Furthermore, the tag position and posture varying unit 12 may have mounted to the crane 19 an ultrasonic transmitter in lieu of the marker 18 and have, in lieu of the stereo camera 14, three ultrasonic receivers arranged at a distance to receive ultrasonic waves to compute the posture of the crane 19 from a difference in arriving times of the ultrasonic waves. Moreover, the control unit 11 may also measure the three-dimensional position of the marker 18 from results of shooting with the stereo camera 14 to measure the direction and elevation angles of the crane 19 and compute the posture of the crane 19.

The present application is based on Japanese Priority Application No. 2011-187603 filed on Aug. 30, 2011, the entire contents of which are hereby incorporated by reference.

The invention claimed is:

1. An RFID evaluation system, comprising:
a tag position and posture varying apparatus which accepts a manual operation from an operator to vary a position of an RFID tag and automatically varies a posture of the RFID tag, wherein the tag position and posture varying apparatus includes a crane which is fixed such that a position, a direction angle, and an elevation angle of the crane can be manually changed, and the RFID tag, which is fixed to the crane such that a posture may be controlled automatically;
an antenna which transmits a transmit radio signal for testing to the RFID tag and which receives a receive radio signal transmitted from the RFID tag; and
a controller which, for each combination of the position and the posture of the RFID tag, controls the antenna to measure a response radio wave strength of the RFID tag, wherein the controller includes a processor which measures the position of the RFID tag; and
an information providing apparatus which provides information for moving the RFID tag to a target position,
wherein the processor reports to the tag position and posture varying apparatus that the RFID tag moved to the target position; and
the processor controls the antenna to measure the response radio wave strength of the RFID tag, when it is reported from the tag position and posture varying apparatus that a relative posture of the RFID tag relative to the antenna became a predetermined posture, wherein
the tag position and posture varying apparatus includes a posture controller which provides successive control such that a relative posture of the RFID tag relative to the antenna becomes the predetermined posture when it is reported from the controller that the RFID tag moved to the target position; and
the processor, after the relative posture of the RFID tag relative to the antenna became the predetermined posture, reports to the controller that the relative posture of the RFID tag relative to the antenna became the predetermined posture.

2. The RFID evaluation system as claimed in claim 1, wherein the processor shoots a marker fixed to the tag position and posture varying apparatus to compute a three-dimensional position of the marker and computes a three-dimensional position of the RFID tag from a positional relationship between the marker and the RFID tag.

3. The RFID evaluation system as claimed in claim 2, wherein the tag position and posture varying apparatus includes:
the marker, which is fixed to the crane; and
a screen, which is fixed to the crane.

4. The RFID evaluation system as claimed in claim 1, wherein the information providing apparatus projects information for moving the RFID tag to the target position onto a screen fixed to the tag position and posture varying apparatus.

5. An apparatus which is included in an RFID evaluation system for evaluating an RFID system, the apparatus comprising:
a tag position and posture varying apparatus which accepts a manual operation from an operator to vary a position of an RFID tag and automatically varies a posture of the RFID tag, wherein the tag position and posture varying apparatus includes a crane which is fixed such that a position, a direction angle, and an elevation angle of the crane can be manually changed, and the RFID tag, which is fixed to the crane such that a posture may be controlled automatically;
an antenna which transmits a transmit radio signal for testing to the RFID tag and which receives a receive radio signal transmitted from the RFID tag;
a controller which, for each combination of the position and the posture of the RFID tag, controls the antenna to measure a response radio wave strength of the RFID tag, the apparatus further including:
a processor which measures the position of the RFID tag; and
an information providing apparatus which provides information for moving the RFID tag to a target position,
wherein the processor reports to the tag position and posture varying apparatus that the RFID tag moved to the target position; and
the processor controls the antenna to measure the response radio wave strength of the RFID tag, when it is reported from the tag position and posture varying apparatus that a relative posture of the RFID tag relative to the antenna became a predetermined posture, wherein
the tag position and posture varying apparatus includes a posture controller which provides successive control such that a relative posture of the RFID tag relative to the antenna becomes the predetermined posture when it is reported from the controller that the RFID tag moved to the target position; and
the processor, after the relative posture of the RFID tag relative to the antenna became the predetermined posture, reports to the controller that the relative posture of the RFID tag relative to the antenna became the predetermined posture.

6. A non-transitory computer-readable medium storing a target position indicating program which causes a computer to function as the apparatus claimed in claim 5.

* * * * *